United States Patent [19]

Toyama

[11] Patent Number: 4,953,161
[45] Date of Patent: Aug. 28, 1990

[54] MAGNETIC HEAD TRACKING DEVICE USING PLURAL GAPS

[75] Inventor: Akiyoshi Toyama, Nagano, Japan

[73] Assignee: Kabushiki Kaisha Sankyo Seiki Seisakusho, Nagano, Japan

[21] Appl. No.: 263,304

[22] Filed: Oct. 27, 1988

[51] Int. Cl.$^5$ .................. G11B 5/584; G11B 15/12
[52] U.S. Cl. .................. 360/77.12; 360/53; 360/74.1; 360/77.01; 360/62; 360/63
[58] Field of Search .................. 360/31, 53, 61–63, 360/75, 76, 77.01, 77.02, 77.06–77.17, 107, 109, 121, 74.1

[56] References Cited

U.S. PATENT DOCUMENTS 4,164,764 8/1979 Joannou .................. 360/77.02

FOREIGN PATENT DOCUMENTS 52-56906 10/1977 Japan .................. 360/77.01

Primary Examiner—Alan Faber
Assistant Examiner—Steven R. Garland
Attorney, Agent, or Firm—Sughrue, Mion, Zinn, Macpeak & Seas

[57] ABSTRACT

A recording and reproducing system for performing a read-after-write operation, and for performing automatic tracking. The system includes a magnetic head for recording/reproducing information from/onto a tape. The magnetic head has a first gapped portion and a second gapped portion. The system further includes a reading circuit for reading information recorded on the tape, a writing circuit for writing information onto the tape, a changing device for selectively connecting the first gapped portion to either the reading circuit or the writing circuit, and for selectively connecting the second gapped portion to either the reading circuit or the writing circuit, and a comparator for comparing the outputs from the first and second gapped portions when the first and second gapped portions are each connected to the reading circuit by the changing device, and for outputting a signal representative of that comparison. The system also includes a motor operatively coupled to the output of the comparator for moving the magnetic head in a width direction relative to the tape in accordance with the output of the comparator.

9 Claims, 2 Drawing Sheets

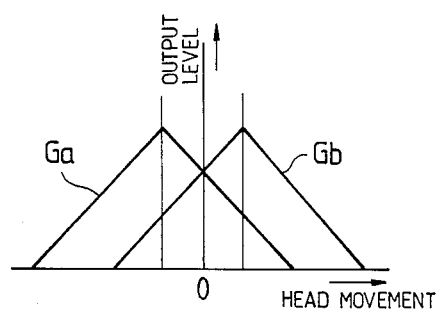
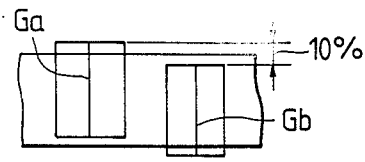
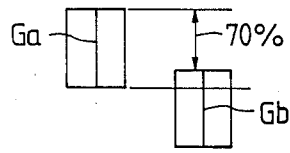
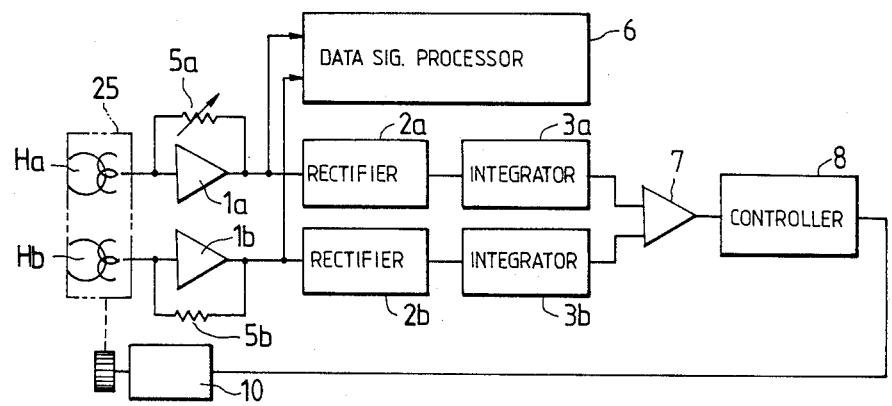
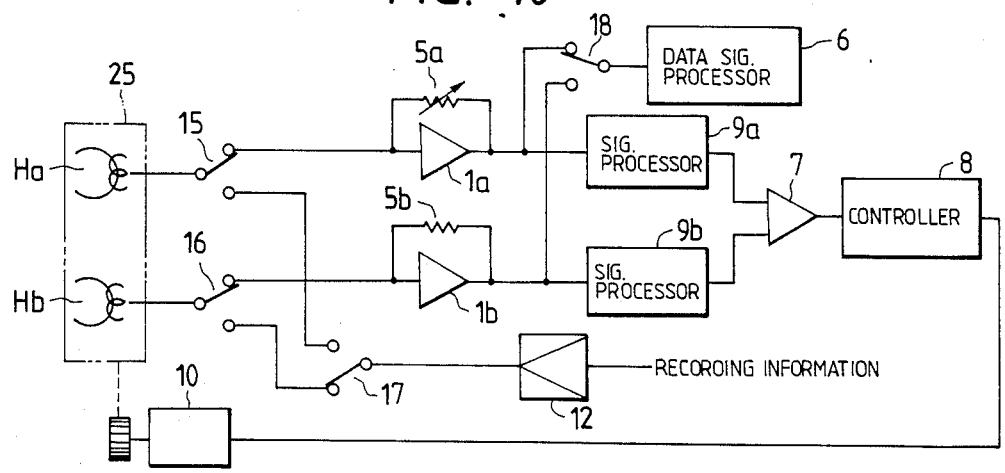

MAGNETIC HEAD TRACKING DEVICE USING PLURAL GAPS

FIELD OF THE INVENTION

The present invention relates to a magnetic head device capable of performing a read-after-write operation and automatic tracking.

BACKGROUND OF THE INVENTION

FIGS. 1 and 2 show conventional read-after-write magnetic heads for magnetic tape apparatuses of the multi-track serpentine recording type in which a recording tape having a plurality of recording tracks is run backward and forward to sequentially record or reproduce information onto or from the tape.

In the conventional read-after-write magnetic head shown in FIG. 1, a first reading element Ra and a first writing element Wa are provided for one recording track a second writing element Wb and a second reading element Rb are provided for another recording track and are positionally related to each other in a reverse relationship relative to the first reading element RA and the first writing element WA, and an erasing element E extends over both the recording tracks.

In another conventional read-after-write magnetic head shown in FIG. 2, a first writing element Wa, a reading element R and a second writing element Wb are provided in that order for a recording track, and an erasing element E extends over a plurality of recording tracks.

Each of the conventional read-after-write magnetic heads is fixedly or movably attached in the direction of the width of the recording track, and performs small-width recording and large-width reproduction or large-width recording and small-width reproduction in order to secure a margin to avoid going off the recording track.

Since each of the elements of the conventional read-after-write magnetic heads is exclusively used for recording, reproduction or erasure at least three of the elements are needed for multi-track serpentine recording. Besides, the conventional magnetic head shown in FIG. 1 has three gapped portions which come into contact with the recording track of the recording tape, and the other conventional magnetic head shown in FIG. 2 has four gapped portions which come into contact with the recording track of the tape. For that reason, the number of elements of each of the conventional magnetic heads is relatively large, and the heads are disadvantageous in providing a good contact with the recording tape.

A recording tape having a width of ¼ inch and 24 recording tracks therein has recently been used to perform recording and reproduction. Since the width of each of the tracks is as small as 0.229 mm, the conventional magnetic heads are likely to go off the track at the time of reproduction. In order to prevent the magnetic head from going off the track at the time of reproduction, it is required to enable automatic tracking at the time of reproduction in both the forward and backward directions of running of the tape. However, it is difficult to enable the automatic tracking with the conventional magnetic heads.

SUMMARY OF THE INVENTION

The present invention was made in order to solve the above-mentioned problems of the conventional read-after-write magnetic heads.

Accordingly, it is an object of the present invention to provide a magnetic head device which can perform not only a read-after-write operation but also automatic tracking, and in which the number of elements of the magnetic head of the device is relatively small, and the number of the gapped portions of the magnetic head which are placed in sliding contact with a recording medium, is also relatively small.

The magnetic head device includes a magnetic head and a changeover means. The magnetic head has a first gapped portion capable of being optionally changed over by the changeover means to function as a reading gapped portion or a writing gapped portion, and a second gapped portion having the same track width and the same azimuth angle as the first gapped portion and capable of being optionally changed over by the changeover means to function as a reading gapped portion or a writing gapped portion. The positions of the first and the second gapped portions are different from each other in the direction of the width of the recording track of the recording medium.

At the time of recording of information onto the recording medium, the functions of the first and the second gapped portions are set by the changeover means so that the gapped portion in the upstream position in the direction of running of the recording track of the recording medium functions as a writing gapped portion and the other gapped portion in the downstream position in that direction functions as a reading gap. The read-after-write operation can thus be performed.

At the time of reproduction of information from the recording track of the recording medium, the functions of the first and the second gapped portions are set by the changeover means so that both the gapped portions function as reading gapped portions, and the outputs from the gapped portions are compared with each other to perform the automatic tracking.

At the time of the recording of information onto the recording track of the recording medium recorded information is reproduced from the track by the gapped portion of the downstream position in the direction of running of the track of the medium and the former information is thereafter recorded onto the track of the medium by the gapped portion in the upstream position in the running direction. The read-after-write operation is thus performed.

If both the gapped portions of the magnetic head are in mutually-unequal sliding contact with the recording track of the recording medium, there is a difference between the levels of the outputs from the gapped portions functioning as reading gaps at the time of reproduction of information from the track of the medium, because the gapped portions have the same track width and the same azimuth angle as each other but the positions of the gapped portions are different from each other in the direction of the width of the track of the medium. The automatic tracking can be performed by adjusting the position of the magnetic head in the direction of the width of the recording track of the recording medium so as to equalize the levels of the outputs from the gapped portions to each other.

Although the number of the elements of the magnetic head is relatively small, the read-after-write operation can be performed regardless of the direction of running of the recording medium.

Since the number of the elements of the magnetic head is relatively small good contact between the magnetic head and the recording medium is provided and the magnetic head is relatively easy to manufacture.

DESCRIPTION OF THE DRAWINGS

FIG. 7 shows the changes in the levels of the outputs from the gapped portions of the magnetic head in the reproduction mode thereof;

FIG. 8 shows a block diagram of a reproduction circuit employing the magnetic head;

FIGS. 9(a) and 9(b) show the differences between the positions of the gapped portions of the magnetic head in the direction of the width of the recording track of the recording medium; and FIG. 10 shows a block diagram of a recording and reproduction circuit employing the magnetic head.

DETAILED DESCRIPTION OF EXEMPLARY EMBODIMENTS

An embodiment of the present invention is hereafter described in detail with reference to the drawings attached hereto.

Figure 1:
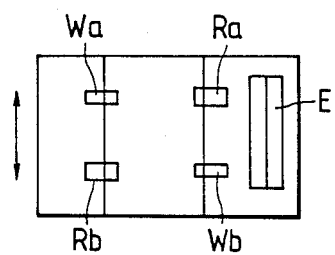
FIG. 1 shows a front view of a conventional magnetic head.
Figure 2:
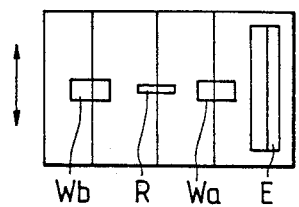
FIG. 2 shows a front view of another conventional magnetic head.
Figure 3:
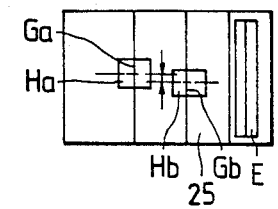
FIG. 3 shows a front view of a magnetic head which is an embodiment of the present invention.
Figure 4:
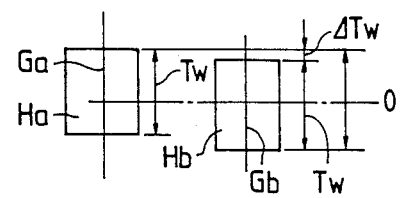
FIG. 4 shows an enlarged front view of a major part of the magnetic head.

FIG. 3 shows a magnetic head 25 which is an embodiment of the present invention, and in which an element Ha having a first gapped portion Ga, an element Hb having a second gapped portion Gb and an erasing element E extending over a plurality of recording tracks are juxtaposed. The first gapped portion Ga and the second gapped portion Gb have the same track width Tw and the same azimuth angle as each other, as shown in FIG. 4. The positions of the gapped portions Ga and Gb are different from each other by a length of $\Delta Tw$ in the direction of the width of the recording track of a recording tape. Each of the first and the second gapped portions Ga and Gb can be optionally changed over to function as a reading gapped portion or a writing gapped portion by a changeover means such as a switch, depending on the direction of running of the recording tape or on the mode of recording or reproduction.

Figure 5A:
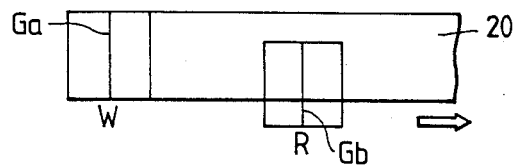
FIGS. 5(a) and 5(b) show the relationships between the magnetic head and &he recording track of a recording medium at the time of forward running thereof.
Figure 5B:
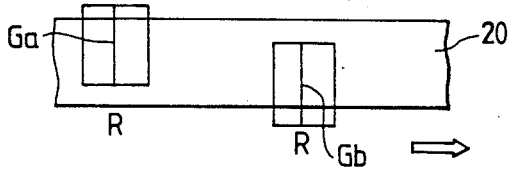

FIG. 5(a) shows the recording mode of the magnetic head 25 at the time of forward running of the recording tape. FIG. 5(b) shows the reproduction mode of the magnetic head 25 at the time of forward running of the recording tape.

In the recording mode shown in FIG. 5(a), the function of the magnetic head 25 is set by the changeover means so that the first gapped portion Ga in the upstream position relative to the direction of running of the recording track 20 of the recording tape functions as a writing gapped portion and the second gapped portion Gb in the downstream position relative to tape running direction functions as a reading gapped portion. As a result, recorded information is reproduced from the recording track of the tape by the second gapped portion Gb after new information is recorded in the track by the first gapped portion Ga. Read-after-write operation is thus performed by the magnetic head.

In the reproduction mode shown in FIG. 5(b), the function of the magnetic head is set by the changeover means so that the first and the second gapped portions Ga and Gb each functions as reading gapped portions. As a result information recorded in the same track of the recording tape is reproduced by the first and the second gapped portions Ga and Gb so that reproduction outputs of the same wave form are obtained from the gapped portions. Since the positions of the first ant the second gapped portions Ga and Gb are different from each other in the direction of the width of the recording track of the recording tape, the levels of the outputs from the two gapped portions Ga and Gb will be equal to each other if the gapped portions are in mutually-equal sliding contact with the track. The levels of the outputs from the gapped portions Ga and Gb are not equal to each other if the gapped portions are in mutually-unequal sliding contact with the track of the tape.

FIG. 7 shows that the levels of the outputs from the first and the second gapped portions Ga and Gb changes as the magnetic head 25 is moved in the direction of the width of the recording track of the recording tape. Since the positions of the gapped portions Ga and Gb are different from each other in the direction of the width of the track of the tape the position of the magnetic head 25 for the peak of the level of the output from the first gapped portion Ga and that of the magnetic head for the peak of the level of the output from the second gapped portion Gb differ from each other in the direction of the width of the track of the tape. The levels of the outputs from the gapped portions Ga and Gb are equal to each other when the magnetic head 25 is at the middle between the positions thereof for the peaks of the levels of the outputs. For that reason, if the position of the magnetic head 25 is adjusted in the direction of the width of the recording track of the tape to equalize the levels of the outputs from the gapped portions Ga end Gb to each other through comparing the levels with each other, the magnetic head does not go off &he track of the tape, so that good reproduction is performed by the head. The adjustment can be automatically performed as described hereinafter. In other words, automatic tracking can be performed.

Figure 6A:
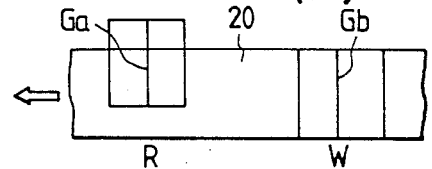
FIGS. 6(a) and 6(b) show the relationships between the magnetic head and the recording track of the recording medium at the time of backward running thereof.
Figure 6B:
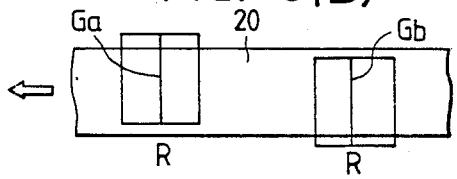

FIG. 6(a) shows the recording mode of the magnetic head 25 at the time of backward running of the recording tape. FIG. 6(b) shows the reproduction mode of the magnetic head 25 at the time of backward running of the recording tape.

In the recording mode shown in FIG. 6(a), the function of the magnetic head 25 is set by the changeover means so that the second gapped portion Gb in the upstream position relative to the direction of running of the recording track 20 of the recording tape functions as a writing gapped portion and the first gapped portion Ga in the downstream position relative to the running direction functions as a reading gapped portion. As a result, recorded information is reproduced from the track 20 of the tape by the first gapped portion Ga after new information is recorded in the track by the second gapped portion Gb. Read-after-write operation is thus performed by the magnetic head 25.

In the reproduction mode shown in FIG. 6(b), the function of the magnetic head 25 is set by the changeover means so that the first and second gapped portions Ga and Gb each functions as reading gapped portions. As a result, the magnetic head 25 performs an operation similar to that in the reproduction mode shown in FIG. 5(b). Automatic tracking can be performed through comparing the levels of the outputs from the gapped portions Ga and Gb with each other, in this case as well.

FIG. 8 shows a reproduction circuit employing the magnetic head 25 and capable of performing the automatic tracking. The reproduction outputs from the first and the second elements Ha and Hb having the first and the second gapped portions Ga and Gb are supplied to amplifiers 1a and 1b. The respective outputs from the amplifiers 1a and 1b are rectified by rectifiers 2a and 2b, the outputs from which are integrated by respective integrators 3a and 3b. The levels of the outputs from the integrators 3a and 3b are compared with each other by a comparator 7. A controller 8 regulates a step motor 10 depending on the comparison output from the comparator 7, to thereby adjust the position of the magnetic head 25 in the width direction of the recording track of the recording tape by the step motor. The outputs from the amplifiers 1a and 1b are also supplied to a data signal processor 6, thereby subjecting the outputs to prescribed data processing. Feedback resistors 5a and 5b are connected to the amplifiers 1a and 1b. Each of the feedback resistors 5a and 5b is a variable resistor by which the difference between the levels of the outputs from the amplifiers 1a and 1b, which results from the difference between the output characteristics of the elements Ha and Hb, is adjusted in terms of the difference between the quantities of feedback through the feedback resistors 5a and 5b.

When the gapped portions Ga and Gb of the elements Ha and Hb of the magnetic head 25 are in mutually-unequal sliding contact with the track of the tape, there is a difference between the level of a signal generated through the amplifier 1a, the rectifier 2a and the integrator 3a and that of a signal generated through the amplifier 1b, the rectifier 2b and the integrator 3b. The comparator 7 sends out a signal corresponding to this difference. The controller 8 drives the step motor 10 depending on the signal from the comparator 7, to move the magnetic head 25 in the direction of the width of the track of the tape. When the gapped portions Ga and Gb of the elements Ha and Hb of the magnetic head 25 are put into mutually-equal sliding contact with the track of the tape by the movement of the magnetic head, the levels of the two signals supplied to the comparator 7 become equal to each other so that the output from the comparator becomes zero. As a result, the step motor 10 is stopped so that the magnetic head 25 is positioned where it is.

As mentioned above, the positions of the gapped portions Ga and Gb having the same track width and the same azimuth angle as each other are different from each other in the direction of the width of the track of the recording tape and the levels of the outputs from the gapped portions at the time of reproduction of information from the tape are compared with each other to regulate the position of the magnetic head 25 by the signal resulting from the comparison, to thereby perform the automatic tracking. It is not necessary to perform such automatic tracking at the time of recording of information onto the tape.

The difference between the positions of the gapped portions Ga and Gb, which is necessary to enable the automatic tracking, is at least about 10% of the track width of each of the gapped portions, as shown in FIG. 9(a). If the difference is smaller than about 10% of the track width, it is difficult to compare the levels of the outputs from the gapped portions Ga and Gb with each other. If the difference is not smaller than 70% of the track width, as shown in FIG. 9(b), the levels of the outputs from the gapped portions Ga and Gb become not higher than 30% of those of the proper reproduction outputs therefrom in the read-after-write operation to deteriorate the ratio of signal to noise so as to reduce the reliability of the operation of the magnetic head 25.

FIG. 10 shows a recording and reproduction circuit employing the magnetic head 25 and including switches 15, 16, 17 and 18 as changeover means for changing over the functions of the two gapped portions Ga and Gb of the elements Ha and Hb of the magnetic head. The same reference symbols in FIGS. 8 and 10 denote the mutually corresponding portions of the circuits shown therein. The signal processor 9a of the recording and reproduction circuit shown in FIG. 10 comprises a rectifier 2a and an integrator 3a which correspond to those of the reproduction circuit shown in FIG. 8. The other signal processor 9b of the recording and reproduction circuit shown in FIG. 10 comprises a rectifier 2b and an integrator 3b which correspond to those of the reproduction circuit shown in FIG. 8. The four switches 15, 16, 17 and 18 of the recording and reproduction circuit serve as the changeover means for changing over the functions of the two gapped portions Ga and Gb of the magnetic head 25.

When the switches 15, 16, 17 and 18 are in the positions shown in FIG. 10, the recording and reproduction circuit is in a reproduction mode so that the reproduction output from the element Ha of the magnetic head 25 is applied to a comparator 7 through the switch 15, an amplifier 1a and the signal processor 9a and that from the other element Hb of the head is applied to the comparator through the switch 16, an amplifier 1b and the signal processor 9b. The operative state of the recording and reproduction circuit at that time is substantially the same as that of the reproduction circuit shown in FIG. 8. In the reproduction mode, automatic tracking is performed depending on the output from the comparator 7, and the reproduction output from the element Ha, which is chosen through the switch 18, is applied to a data signal processor 6.

For recording of information onto the recording track of a recording tape, the switches 15, 16, 17 and 18 of the recording and reproduction circuit are placed in positions depending on the running direction of the tape, so that read-after-write operation is performed. More specifically, for recording of information onto the track of the tape at the time of forward running of the tape as shown in FIG. 5(a), the switches 15, 17 and 18 are put in positions inverse to those shown in FIG. 10, so that the second element Hb of the magnetic head 25 is used as a reproduction element and the reproduction output from the second element Hb is applied to the data signal processor 6 through the switch 16, the amplifier 1b and the switch 18, and subjected to prescribed processing thereby. Immediately after the prescribed processing, an information signal to be recorded in the track of the tape is amplified by an amplifier 12 and then applied to the first element Ha of the magnetic head 25 through the switches 17 and 15 so that the information signal is recorded in the track of the tape. For recording of information onto the track of the tape at the time of backward running of the tape as shown in FIG. 6(a), only the switch 16 is put in a position inverse to that shown in FIG. 10, so that the reproduction output from the first element Ha of the magnetic head 25 is applied to the data signal processor 6 through the switch 15, the amplifier 1a and the switch 18 and subjected to prescribed processing thereby. Immediately after the prescribed processing, an information signal to be recorded into the track of the tape is amplified by the amplifier 12 and then applied to the second element Hb of the magnetic head 25 through the switches 17 and 16 so that the information signal is recorded in the track of the tape.

What is claimed is:

1. A recording and reproduction system employing a magnetic head device in which a first gapped portion capable of being selectively changed to function as one of a reading gapped portion and a writing gapped portion, a second gapped portion having a same track width and a same azimuth angle as said first gapped portion and capable of being selectively changed to function as one of a reading gapped portion and a writing gapped portion and means for changing over the functions of said gapped portions; the positions of said gapped portions are different from each other in a width direction of a track of a recording medium and one gapped portion is located upstream from the other gapped portion, wherein the functions of said gapped portions are set by said changing means at the time of recording of information on said medium so that said gapped portion in an upstream position relative to the direction of running of the track of said medium functions as a writing gapped portion and said gapped portion in the downstream position relative to the running direction functions as a reading gapped portion, to thereby perform a read-after-write operation; and the functions of said gapped portions are set by said changing means at the time of reproduction of information from the track of said medium so that outputs of said gapped portions are compared with each other to perform automatic tracking for said reproduction.

2. A magnetic head device comprising:
   a magnetic head in which a first gapped portion and a second gapped portion having a same track width and a same azimuth angle as said first gapped portion are juxtaposed in the direction of running of the track of a recording medium in such a manner that the positions of the centers of said gapped portions are different from each other in the width direction of the track of said recording medium;
   a reading circuit;
   a writing circuit;
   means for selectively connecting said first gapped portion to one of said reading circuit and said writing circuit;
   means for selectively connecting said second gapped portion to one of said reading circuit and said writing circuit;
   means for comparing reading outputs from said gapped portions with each other; and
   means for moving said head in the direction of the width of the track of said medium depending on a result of said comparison.

3. A magnetic head device according to the claim 2, in which the difference between the positions of the centers of the first and the second gapped portions ranges between 10% and 70% of the track width.

4. A recording and reproducing system for a tape, comprising:
   a magnetic head for recording/reproducing information from/onto a tape, said magnetic head having a first gapped portion and a second gapped portion, the first gapped portion and the second gapped portion having the same azimuth angle and are juxtaposed in the direction of running of a track of the tape in such a manner that the positions of the centers of said first and second gapped portions are different from each other in a width direction of the track of the tape;
   a reading circuit for reading information recorded on the tape;
   a writing circuit for writing information onto the tape;
   means for selectively connecting the first gapped portion to one of said reading and writing circuits, and for selectively connecting the second gapped portion to one of said reading and writing circuits;
   comparing means for comparing outputs from said first and second gapped portions when said first and second gapped portions are each connected to said reading circuit by said selectively connecting means, and for outputting a signal representative of that comparison; and
   moving means, operatively coupled to the output of said comparing means, for moving said magnetic head in a width direction relative to the tape in accordance with the output of said comparing means.

5. The recording and reproducing system of claim 4, wherein during a recording mode of operation, the first gapped portion is connected to said writing circuit and the second gapped portion is connected to said reading circuit by said selectively connecting means, the first gapped portion being upstream of the second gapped portion relative to the running direction of the tape, and wherein said reading circuit reads information from the second gapped portion after said writing circuit supplies writing information to the first gapped portion, thereby performing a read-after-write operation.

6. The recording and reproducing system of claim 4, wherein during a reproduction mode of operation, each of the first and second gapped portions are connected to said reading circuit.

7. The recording and reproducing system of claim 4, wherein said selectively connective means comprises a plurality of switches.

8. The recording and reproducing system of claim 4, wherein said moving means comprises a stepping motor coupled to said magnetic head.

9. The recording and reproducing system of claim 8, further comprising a controller, coupled to the output of said comparing means, for supplying a signal representing the difference in outputs of the first and second gapped portions to said stepping motor.

* * * * *